(12) United States Patent
Codutti et al.

(10) Patent No.: US 9,085,260 B2
(45) Date of Patent: Jul. 21, 2015

(54) LIGHT SOURCE FOR MOTOR VEHICLES

(75) Inventors: Giancarlo Codutti, Venaria Reale (IT);
Stefano Marchesin, Venaria Reale (IT);
Franco Marcori, Moggio Udinese (IT)

(73) Assignee: AUTOMOTIVE LIGHTING ITALIA S.p.A. (IT)

( * ) Notice: Subject to any disclaimer, the term of this patent is extended or adjusted under 35 U.S.C. 154(b) by 288 days.

(21) Appl. No.: 13/700,563

(22) PCT Filed: May 28, 2011

(86) PCT No.: PCT/IB2011/001161
§ 371 (c)(1),
(2), (4) Date: Mar. 6, 2013

(87) PCT Pub. No.: WO2011/148259
PCT Pub. Date: Dec. 1, 2011

(65) Prior Publication Data
US 2013/0175924 A1    Jul. 11, 2013

(30) Foreign Application Priority Data

May 28, 2010  (IT) .............................. TV2010A0081

(51) Int. Cl.
*B60Q 1/00*        (2006.01)
*H05B 33/08*      (2006.01)
(52) U.S. Cl.
CPC .............. *B60Q 1/00* (2013.01); *H05B 33/0887* (2013.01)
(58) Field of Classification Search
CPC ....... H05B 37/03; H05B 33/0887; B60Q 1/00
USPC ...................................................... 315/77, 82
See application file for complete search history.

(56) References Cited

U.S. PATENT DOCUMENTS

| | | | |
|---|---|---|---|
| 3,968,401 A * | 7/1976 | Bryant | 315/293 |
| 2003/0226954 A1 * | 12/2003 | Ohmi | 250/221 |
| 2004/0080273 A1 * | 4/2004 | Ito et al. | 315/77 |
| 2004/0212310 A1 * | 10/2004 | Ito et al. | 315/77 |
| 2009/0261743 A1 * | 10/2009 | Chen et al. | 315/192 |
| 2011/0043114 A1 * | 2/2011 | Hsu et al. | 315/119 |

FOREIGN PATENT DOCUMENTS

WO    WO2007/096868    8/2007

OTHER PUBLICATIONS

Office Action issued in EPO Patent Appl. No. 11 735 530.5-1807, dated Dec. 9, 2013.

* cited by examiner

*Primary Examiner* — Douglas W Owens
*Assistant Examiner* — Pedro C Fernandez
(74) *Attorney, Agent, or Firm* — Matthew A. Pequignot; Pequignot + Myers LLC

(57) ABSTRACT

Light for motor vehicles and the like provided with a lighting device comprising a pair of power supply lines flowed through by a primary supplying current, two or more lighting branches each comprising one or more light sources adapted for being flowed through by a secondary supplying current; and an electronic control circuit configured to determine the secondary current flowing through each lighting branch; limit the primary supplying current to a predetermined minimum value when the secondary current flowing through at least one of said lighting branches is lesser than a predetermined threshold current; control the simultaneous transition of the light sources from a pre-lighting state to a complete-lighting state, when each of the secondary currents flowing through the lighting branches is greater than or equal to the predetermined current threshold.

12 Claims, 4 Drawing Sheets

LIGHT SOURCE FOR MOTOR VEHICLES

RELATED APPLICATION DATA

This application is the national stage entry of International Appl. No. PCT/IB2011/001161, filed May 28, 2011, which claims priority to Italian Patent Application No. TV2010A000081, filed on May 28, 2010. All claims of priority to these applications are hereby made, and each of these applications is hereby incorporated in its entirety by reference.

TECHNICAL FIELD

The present invention relates to a light for motor vehicles and the like.

In particular, the present invention relates to a front or rear light for motor vehicles or motorcycles and the like of a type comprising: a rear cup-shaped hull, which is structured in such a way as to be embedded within a compartment obtained on the vehicle body; a front lenticular body made at least partially of transparent or translucent material and coupled to the rear hull in correspondence to the entrance thereof in order to emerge from the body; and a lighting device housed within the rear hull and comprising, in turn, an array of light emitting sources, corresponding to LEDs (standing for Light Emitting Diodes) arranged facing the front lenticular body, and an electronic control circuit of the array of light emitting sources.

BACKGROUND ART

Lights of the type described above are known, in which the electronic control circuit is configured to control the turning on and/or off of all LEDs simultaneously, producing a luminous effect very similar to that obtained by turning on or off a single-source traditional light, i.e. provided with only one filament lamp.

FIG. 1 shows a lighting device for lights of a known type, indicated as a whole with 1, comprising an array of light emitting sources 2, and an electronic control circuit 3 configured so as to simultaneously turn on/off, the array of light emitting sources 2.

The array of light emitting source 2 comprises a series of lighting branches 4, which are connected in parallel to one another between a first 5 and a second 6 common nodes and each comprises a series of LEDs 7 arranged in series one after the other between the common node 5 and a sensing node 8; a resistor 9 having a first terminal connected to the LED 7 through the sensing node 8, and a diode 10 having the anode connected to the second terminal of the resistor 9 and the cathode connected to the common node 6.

As for the electronic control circuit 3, it comprises a power stage 11 and a driving stage 12.

In particular, the power stage 11 comprises a power unit 13 presenting a first and a second output terminal, which are placed at a voltage VA and respectively at a reference voltage VR e.g. corresponding to a ground voltage VGND, are flowed through by a primary supplying current I1, and are connected to common nodes 5 and 6 of the array of light emitting source 2 via a power supply line 14 and a power supply line 15.

The power stage 11 also comprises a protection diode 16 provided along the power supply line 14 to protect the LEDs 7 from accidental conditions of reverse polarity of the voltage VA, and a resistor 18 also arranged along the power supply line 14 and presenting a resistance whose value is proportional to the resistive drop of the electronic components (not shown) connected upstream of the lighting device 1.

Regarding the driving stage 12, it is configured in such a way as to make the lighting branches 4 transit from a pre-lighting state, in which the LEDs 7 are flowed through by a predetermined minimum secondary current I2=I2M dimensioned so that the light emitted by the LEDs 7 has a predetermined minimum light intensity, and a complete-lighting state, in which the LEDs 7 are flowed through by a predetermined nominal secondary current I2=I2N dimensioned so that the light emitted from the LEDs 7 has a fixed maximum intensity.

In particular, the driving stage 12 comprises a switch 19, which has a first terminal connected to the common node 6, a second terminal connected to the power supply line 15, and a control terminal receiving a logic control signal COM adapt to assume a logical high or low value to respectively control the closing or opening of the switch 19.

The driving stage 12 further comprises a logic gate AND 20 presenting a plurality of inlet terminals connected to the sensing nodes 8 of the lighting branches 4, and an outlet terminal connected to the control terminal of the switch 19.

The driving stage 12 finally comprises, a pull-down circuit 21, which in turn is provided with a series of pull-down resistors 22, each of which is connected between an inlet terminal of the logic gate AND 20 and the power supply line 15, i.e. to ground.

The operation of the lighting device 1 is known and will be resumed below only with regard to the aspects necessary for the understanding of the issues pertaining to the present invention.

In particular, in the pre-lighting state, the switch 19 is opened, the common node 6 of the array of light emitting sources 2 is disconnected from the power supply line 15 and consequently the secondary current I2 flowing through the LEDs need to discharge to ground by way of the pull-down resistors 22 which limit the same to its predetermined minimum value I2M. At this step, the LEDs 7 being flowed through by the minimum secondary current I2M, emit light with a predetermined minimum luminous intensity.

The lighting device 1 transits from the pre-lighting state to the complete-lighting state, when the voltage at the heads of the pull-down resistors 22 is brought from low logic value to high logic value. In this case, the logic gate AND 20 switches on its output terminal the control signal COM to a high logic value, causing the closing of the switch 19 and therefore determining the connection between the common node 6 and the power supply line 15.

At this stage, the secondary current I2 flowing through the LEDs 7 increases until reaching its nominal value I2N thus leading to the emission from the LEDs 7 themselves of a light with nominal intensity.

Thanks to the circuit architecture of the driving stage, the above described lighting device 1 is conveniently able to automatically transit from the complete-lighting state to the pre-lighting state whenever there is a sudden increase in impedance along a lighting branch due to a failure of a LED.

In particular, if the failure of a LED causes the opening of the corresponding lighting branch, it occurs: the interruption of the secondary current flowing through the lighting branch itself, the commutation of the voltage logic value in the corresponding sensing node 8 from top down, the commutation of the voltage logic value of the control signal COM from top down in the output terminal of the logic gate AND 20, and consequently the opening of the switch 19.

However, the circuit architecture of the driving stage 3 described above has the following technical problems.

First, the electronic control circuit of the lighting device described above is able to bring the latter in the pre-lighting state, i.e. in a state of circuital security in which the secondary current flowing through the properly working lighting branches has the minimum value, only in case of a failure corresponding to the opening of the LED, but is unable to intervene in the same way when the failure of a LED causes a short circuit between the terminals of the LED itself.

In particular, in this last case there is an uncontrolled increase of the secondary current flowing in the faulted branch which puts the lighting device in a critical electrical condition being potentially harmful to the electronic components thereof and simultaneously determines the same lighting effect completely dissimilar with respect to a possible on/off state of a traditional single-source light. In fact, at the occurrence of this faulty condition, the LEDs of the lighting branch containing the short circuited LED generate an unwanted distribution of light onto the front lenticular body.

Secondly, the circuit architecture of the electronic control circuit does not reduce the minimum value of the secondary current I2M below a limit threshold, so as to completely interrupt light emission from the LEDs in the pre-lighting state, therefore obtaining a lighting effect equivalent to that of a traditional single-source light in the off state.

In fact, such a reduction would request increasing the resistance of the pull-down resistors and/or simultaneously, a reduction in supply voltage.

However, the resistance of the pull-down resistor can be increased up to a limit beyond which the circuital constraints associated with operational logic voltages of the logic gate AND are no longer satisfied, while the supply voltage has a predetermined standard values range, typically between 8 and 16 volts.

Finally, in the case the LED has a fault corresponding to an open circuit, it occurs, during the device transition from an off state when the primary supplying current is zero, to the pre-lighting state, a temporary increase in secondary current flowing in the properly working branches, which results in the emission of an unwanted pulse of light, the latter condition, even in this case, differs from a traditional single-source light.

DISCLOSURE OF INVENTION

The aim of the present invention is therefore to realize a front or rear light for motor vehicles and the like provided with an electronic control circuit of light emitting sources adapt for overcoming the above described disadvantages.

According to the present invention a light for motor vehicles and the like is provided, as explained in claim 1 and preferably, but not necessarily, in any of the dependent claims therefrom.

According to the present invention is further provided a method for operating a light for motor vehicles and the like, as explained in claim 7, and preferably, but not necessarily, in any of the dependent claims therefrom.

According to the present invention a lighting device for lights for motor vehicles and the like is finally provided, as explained in claim 10 and preferably, but not necessarily, in any of the dependent claims therefrom.

BRIEF DESCRIPTION OF THE DRAWINGS

The present invention will now be described with reference to the annexed drawings, which illustrate a non limitative embodiment thereof, in which:

FIG. 3 schematically shows a variant of the lighting device shown in FIG. 2, while

BEST MODE FOR CARRYING OUT THE INVENTION

The present invention is essentially based on the principle of:
  determining the secondary current flowing through each lighting branch of the array of light emitting sources;
  limiting the primary supplying current to a predetermined minimum value when the secondary current flowing through at least one lighting branch is less than a predetermined corresponding current threshold, and/or
  controlling the simultaneous transition of the light emitting sources from the pre-lighting state to the lighting-state when each of the secondary current flowing through the lighting branches is greater than or equal to a predetermined corresponding current threshold.

In particular, the present invention is based on the idea of connecting a current limiting device in parallel to the switch, i.e. between one of the common nodes of the array of light emitting sources and one of the supply lines; determining the secondary currents flowing through each of the lighting branches; controlling the closing of the switch when each secondary current meets a predetermined relationship with a respective preset current threshold; and, vice versa controlling the opening of the switch when at least one of the determined currents does not meet the preset relationship.

Figure 1:
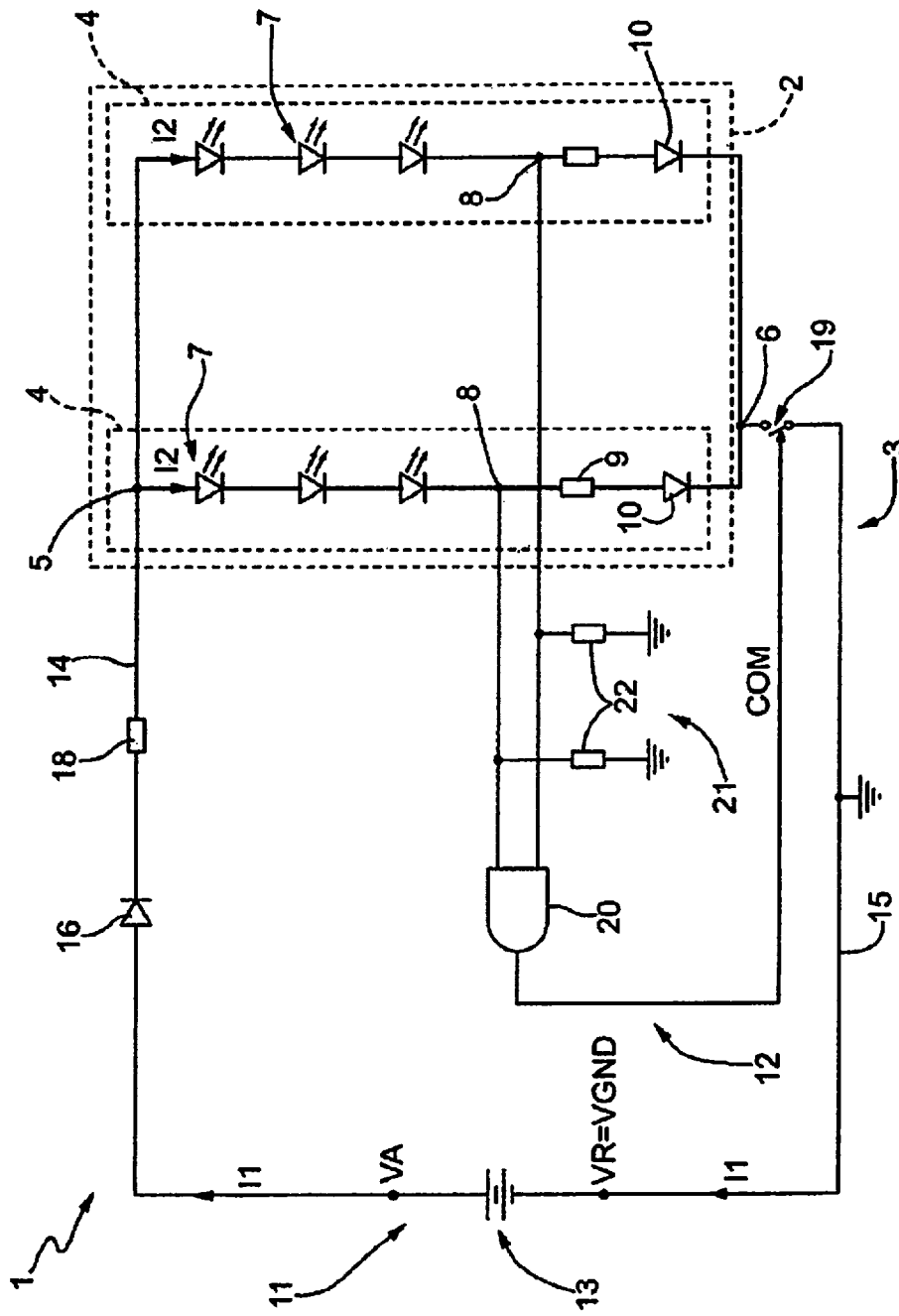
FIG. 1 schematically illustrates a lighting device of a light according to the known art.
Figure 2:
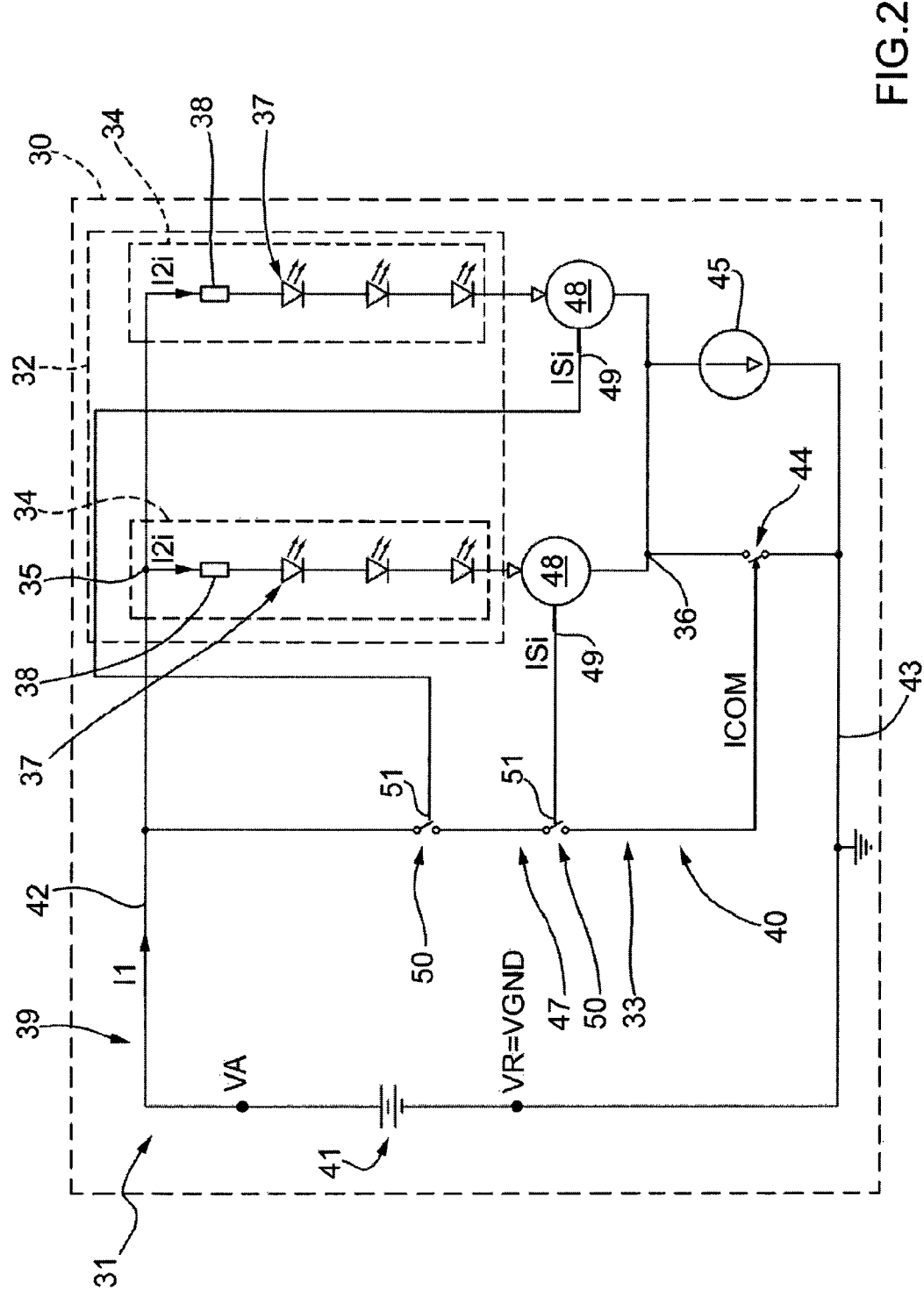
FIG. 2 schematically shows a front or rear light of a motor vehicle and the like provided with a lighting device made according to the principles of the present invention.

With reference to FIG. 2 with number 30 is schematically shown in its entirety, a front or rear light of a motor vehicle or motorcycle and the like, which is provided with a rear hull (not shown) structured so that it can be embedded within a compartment (not shown) obtained on the vehicle body (not shown), a front lenticular body (not shown) made of at least partially transparent or translucent material and coupled to the hull so as to emerge from the rear surface of the body vehicle (not shown).

The light 30 is also provided, with a lighting device 31, which is adapted for being housed within the rear hull (not shown) and includes an array of light emitting sources 32 adapted for being placed in a position facing the front lenticular body (not shown), and an electronic control circuit 33 configured so as to simultaneously turn on/off, the array of light emitting sources 32.

The array of light emitting sources 32 comprises a set of lighting branches 34 (only two of which are shown in FIG. 2), which are connected in parallel between a first 35 and a second 36 common node and each comprising a series of light emitting sources arranged in series one after the other and connected between the second common node 36 and the first common node 35 through a resistor 38.

Figure 3:
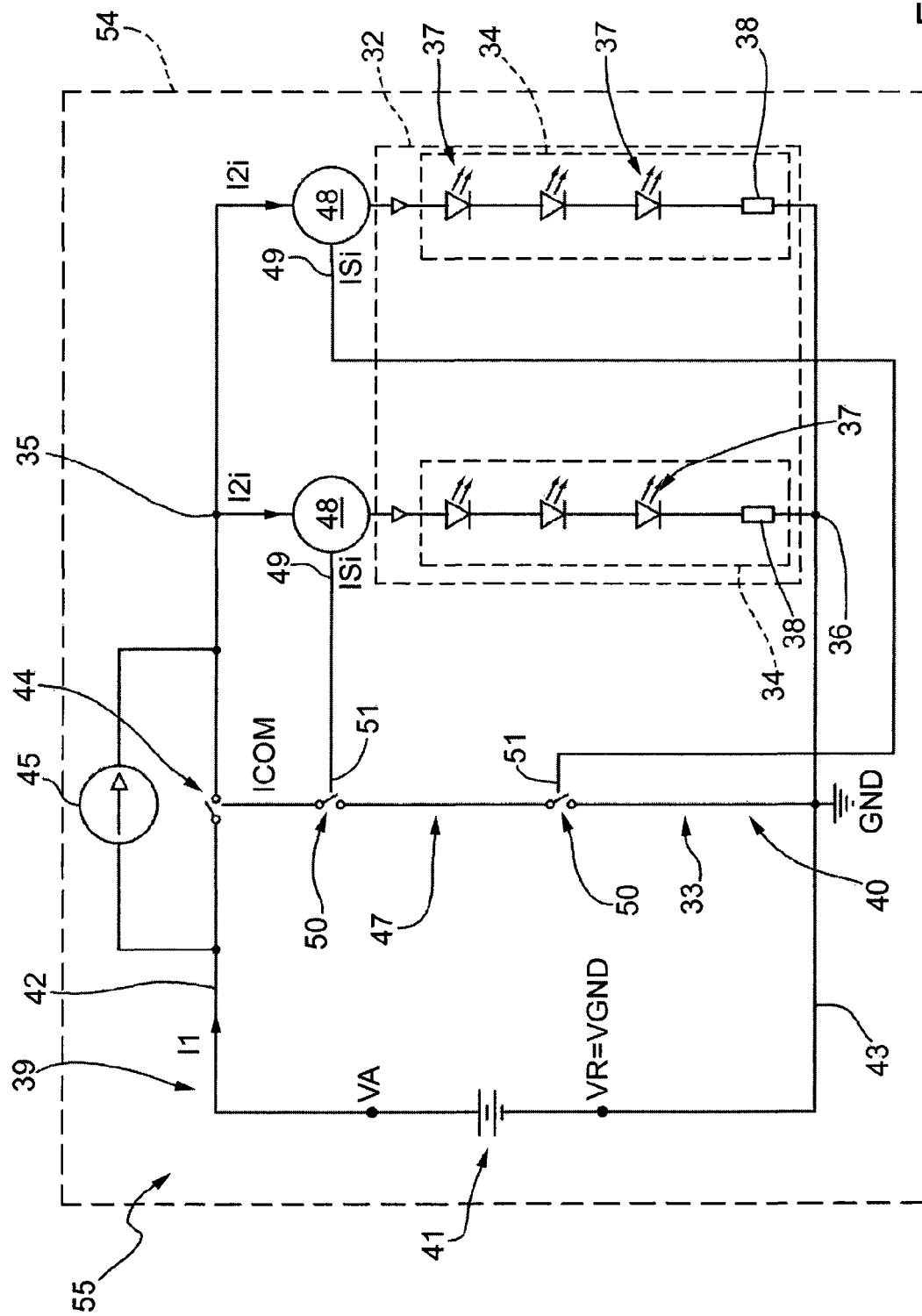
Figure 4:
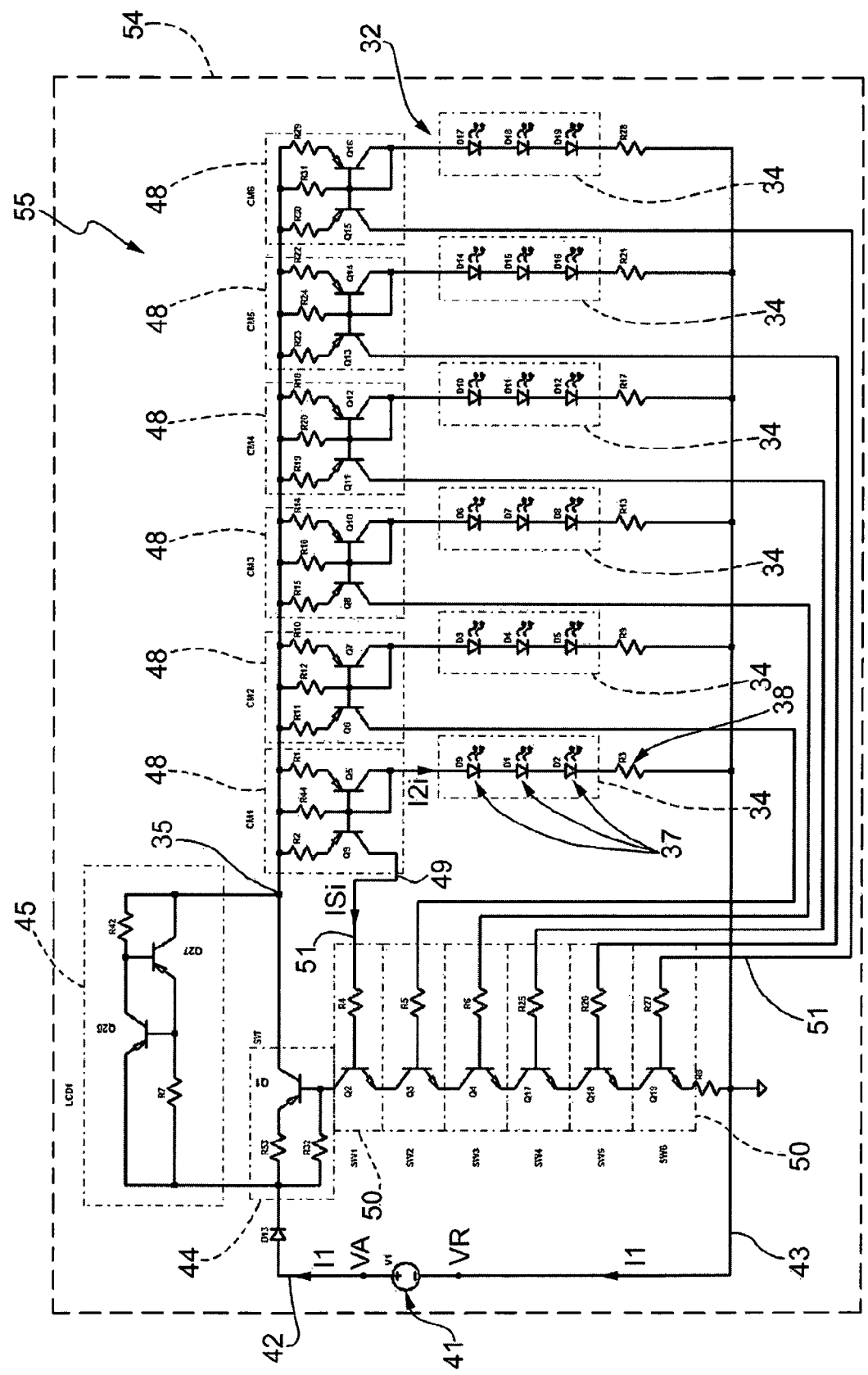
FIG. 4 is a circuital diagram of the lighting device shown in FIG. 3.

With reference to the example shown in FIGS. 2, 3 and 4, the light emitting sources comprise LEDs 37.

However, it should be noted that the light emitting sources may comprise OLEDs (which stands for Organic Light Emitting Diodes) and/or bulbs.

Regarding however, the electronic control circuit 33, it comprises a supply stage 39 and a driving stage 40.

In particular, the supply stage 39 comprises a supply unit 41 presenting a first and a second output terminal, which are set at a corresponding first and second voltage preferably, but not necessarily, a supply voltage VA, and respectively, at a reference voltage VR such as a ground voltage, and are able of being connected to the common nodes 35 and 36 of the array of light emitting sources 32 through a pair of supply lines 42 and 43.

More specifically, the supply lines 42 and 43 are flowed through by a primary supplying current I1, while the lighting branches 34 are each flowed through by a secondary supplying current I2$i$ (with i comprised between 1 and N, where N is the number of lighting branches).

Regarding the driving stage 40, it is configured to determine the secondary currents I2$i$ flowing through lighting branches 34 and controls the array of light emitting sources 32 to make it transit in a pre-lighting state when at least one of the secondary currents I2$i$ does not meet a predetermined relationship with a predetermined respective current threshold (i comprised between 1 and N) or, alternatively, in a complete-lighting state, where each secondary current I2$i$ meets said preset relationship with the predetermined current threshold Si.

In particular, in the pre-lighting state, the array of light emitting sources 32 receives as input a primary supplying current less than or equal to a minimum primary supplying current I1M, while each lighting branch 34 is flowed through by a secondary current less than or equal to a predetermined minimum secondary current I2Mi, sized so that the light emitted by the LEDs 37 has a predetermined minimum lighting intensity.

More specifically, the primary minimum supplying current I1M is less than a nominal primary supplying current I1N, while the predetermined minimum secondary current I2Mi is less than a nominal secondary current I2Ni.

In the complete-lighting state, the array of light emitting sources 32 receives as input the nominal primary supplying current I1N, while each lighting branch 34 is flowed through by the respective nominal secondary current I2Ni sized so that the light emitted by LEDs 37 has a predetermined nominal intensity.

The driving stage 40 comprises a switch 44 and a current limiting device 45, which are connected in parallel to one another between one of the common nodes 35 or 36, and one of the supply lines 42 or 43.

In the example shown in FIG. 2, the switch means 44 has a first terminal connected to a common node 36, a second terminal connected to the supply line 43 and a control terminal preferably with controlled current.

In particular, in the example shown in FIG. 2, the switch means 44 is configured to switch to the off state when the control terminal receives a control current ICOM, and vice versa as to switch to the on state in the absence of current ICOM on the control terminal itself.

As for the current limiting device 45, it is connected in parallel to the switch 44 and is configured so as to limit the primary supplying current I1 flowing through the array of light emitting sources 2 at the value corresponding to the minimum supply current I1M.

The driving stage 40 further comprises a control device 47, which is configured to generate or not the control current ICOM necessary for closing the switch 44 according to the secondary current I2$i$ flowing through the lighting branches 34.

According to what is shown in FIG. 2, the control device 47 comprises a plurality of current mirrors 48, each of which is arranged along a corresponding lighting branch 34 and is configured so as to generate on its own output terminal 49 a mirrored current ISi equal or proportional to the secondary current I2$i$ flowing in the lighting branch 34 itself, when the secondary current I2$i$ is greater than the predetermined current threshold Si.

The control device 47 also comprises a plurality of switch means 50 (only two of which are shown in FIG. 2), which are connected together in series between a common node 35 or 36 and the control terminal of the switch 44 and are each configured to transit from the on state to the off state upon receiving on its control terminal 51, the mirrored current ISi generated by a corresponding current mirror 48.

In particular, in the example shown in FIG. 2, each current mirror 48 has a terminal connected to a LED 37 provided along the lighting branch 34 at the end of the series of LEDs 37 and a terminal connected to the common node 36.

In this case, each current mirror 48 is configured to determine, indirectly, the secondary current I2$i$ flowed through the lighting branch 34 and, when the secondary current I2$i$ is greater than the predetermined current threshold Si, it generates on the output terminal 49 the mirrored current ISi.

Each switch means 50 is instead configured to transit from the on state to the off state when the mirrored current ISi is received by a corresponding current mirror 48 or, vice versa, transferring back to the on state when there is no current on the control terminal 51 thereof.

In particular, the driving stage 40 is configured to control the closing of each switch means 50 through a current mirror 48 when the secondary current I2$i$ is greater than or equal to a preset current threshold Si, while vice versa, controls the opening of each switch means 50 when the secondary current I2$i$ is less than the preset threshold current Si itself.

In the example shown in FIG. 2, the current threshold Si is set at a value substantially less than or equal to the minimum secondary current I2M.

In use, in the initial step the array of light emitting sources 32 is supplied by the supply voltage VA and the lighting device 31 is temporarily in the pre-lighting state in which: the switch means 50 are open, the control current ICOM is zero, the switch 44 is open, the primary supply current I1 during the initial transferral is limited by the current limiting device 45, and the secondary currents I2$i$ flowing through each lighting branch 34 gradually increase their intensity until reaching the predetermined minimum value I2Mi.

The lighting device 31 finishes the pre-lighting state and transits to a full-lighting state when all the secondary currents I2$i$, and consequently all respective mirrored currents ISi result to be greater than or equal to the respective preset current thresholds Si. When the latter condition occurs, the current mirrors 48 supply mirrored currents ISi on the control terminals 51 of the switch means 50 causing the closing thereof.

The closing of the switch means 50 determines the generation of the control current ICOM controlling the closing of switch which connects the array of light emitting sources 32 directly to ground thus excluding the limitation of the primary supply current I1 by the current limiting device 45.

At this stage, therefore, the supply current passes from its minimum value I1M to its nominal value I1N, and simultaneously each secondary current I2$i$ passes from its minimum value I2Mi to the nominal value I2Ni.

The architecture of the driving stage 40 described above advantageously allows the lighting device 31 to automatically transit to the pre-lighting state whenever a circuit fault occurs due to damage to a LED causing a sharp increase of the impedance present between the terminals of the LED itself or, in extreme cases, the opening of the lighting branch between the terminals of the LED.

In this case, the secondary current I2i flowing through the malfunctioning lighting branch 34 nullified, the corresponding current mirror 48 interrupts the generation of mirrored current ISi causing the opening of the switch means 50 and the interruption of the control current ICOM, thus causing the opening of the switch means 44.

At this point, the common node 36 is disconnected from ground and the primary supply current I1 having to necessarily flow through the primary current limiting device 45 is limited by the same to the minimum nominal current value I1M. In this case, therefore, the lighting device 31 switches to the pre-lighting state and the secondary current I2i flowing in the other lighting branches 34 transfers to its minimum value I2Mi.

If instead the lighting device 31 switches from an off state, where the supply current I1 is zero to a pre-lighting state and there is a failure of at least one LED 37 on a lighting branch 34 causing a strong decrease of impedance between the terminals of the LED 37 itself or, in extreme cases, a short circuit between the terminal of the LED 37, the lighting device 31 is conveniently maintained in the pre-lighting state.

In particular, in this case the short circuit of the LED 37 reduces the load, i.e. the impedance present along the malfunctioning lighting branch 34 leading to, first, an increase in secondary current I2i along the lighting branch 34 itself that however is limited due to the presence of the current limiting device 45 and, secondly, a strong decrease to zero of the secondary current I2i flowing through the remaining properly functioning lighting branches 34.

In this case, the current mirrors 48, being flowed through by a secondary current I2i below the minimum current threshold Si do not generate the mirrored current ISi and keep the corresponding switch means 50 open. Therefore in this condition the switch 44 remains open and the primary supplying current I1 is limited by the current limiting device 45.

In the event of a failure being only temporary, the lighting device 31 described above is advantageously able to automatically transit from the pre-lighting state to the complete-lighting state.

In fact, if during the pre-lighting state a failure occurs corresponding to an increase in impedance and/or opening of the LED 37, then the respective lighting branch 34 is flowed through again by the secondary current I2i that transits to its minimum value I2Mi, similar to the secondary currents I2i flowing through the remaining lighting branches 34. In this step, current mirrors 48 then generate the mirrored currents ISi which close the switch means 50 and control, consequently the closing of the switch means 44 and the passage of the lighting device 31 in the complete-lighting state.

If, however, during the pre-lighting state, there is the end of a failure corresponding to a strong decrease of the impedance or short circuit of the LED 37, then the respective lighting branch 34 and the remaining branches are again flowed through by the respective secondary currents I2i that transit to the minimum value I2Mi. In this step, current mirrors 48 then generate the mirrored currents ISi that control the closing of all the switch means 50 and cause, consequently, the closing of the switch means 44 and the transit of the lighting device to the complete-lighting state.

In FIG. 3 is schematically shown a variant embodiment of a light, in which parts identical or equivalent to those of the light 30 described above are identified with the same reference numbers.

In particular, the circuit topology of the lighting device, indicated with 55, of the light indicated with 54, differs from the lighting device 31 of the light 30:

for the fact that each resistor 38 is connected between the LED 37 and the common node 36, i.e. to ground instead of to the common node 35, and each current mirror 48 is connected between the common node 35 and the LED 37 placed at the end of the lighting branch 34;

for the fact that the switch 44 is connected between the common node 35 and the power supply line 42;

for the fact that the switch means 50 are arranged in series between the control terminal of the switch 44 and the ground;

for the fact that the current limiting device 45 is connected between the common node 35 and the power supply line 42 in parallel to the switch 44.

The operation of the lighting device 55 is fully equivalent to that of the lighting device 31 detailed above and therefore will not be further described.

FIG. 4 shows a possible example of a circuit diagram of the lighting device 55 of the light 54 in which the N number of lighting branches 34 is equal to six rather than two as shown in FIG. 3. Consequently, the lighting device 55 comprises six switch means 50, and six current mirrors 48.

In detail, in the example shown in FIG. 4, the switch 44 comprises a transistor Q1 of BJT type having an emitter terminal connected to the power supply line 42 by way of a resistor R53 and the base terminal connected to the power supply line by way of a resistor R32; and the switch means 50 comprise a series of transistors Q3, Q4, Q17, Q18, of BJT type and each with the emitter terminal connected to the collector terminal of an adjacent transistor, a transistor Q2 having an emitter terminal connected to the collector terminal of the transistor Q3 and the collector terminal connected to the base terminal of the transistor Q1, and a transistor Q19 having a collector terminal connected to the emitter terminal of the transistor Q18, and the emitter terminal connected to ground by way of a resistor R8.

As for the current limiting device 45, in the example shown in FIG. 4 it comprises a transistor Q27 of BJT type having the collector terminal connected to the common node 35, the emitter terminal connected through a resistor R7 to the power supply line 42; a transistor Q26 of BJT type having the emitter terminal connected to the power supply line 42, and the collector terminal connected to the base terminal of the transistor Q27 and to the common node 35 by way of a resistor R42.

Each current mirror 48, for example, the current mirror indicated by the abbreviation CM1, comprises a first and a second transistor Q5 and Q9 of BJT type with the base terminals connected together and to the collector terminal of the first transistor Q5 and to the common node 35 by way of a threshold adjustment resistor R44. The first transistor Q5 also has the emitter terminal connected to the common node 35 by way of a resistor R1, the collector terminal connected to one of the LEDs 37 in the lighting branch 34, while the second transistor Q9 has the emitter terminal connected to the common node 35 by way of a resistor R2, the collector terminal connected to the base terminal of the transistor Q2 by way of a resistor R4.

It should be noted from the above-described that the presence of the resistor R32 in the switch 44 conveniently increases the stability of the circuit, while the presence of the threshold adjustment resistor R44 in the current mirror 48 and similarly the resistors shown in FIG. 4 with the abbreviations R12, R16, R20, R24 and R31 in the respective current mirrors 48 advantageously allow the adjusting of the current thresholds Si provided in each current mirror 48 for the actuating thereof and the generation of the output mirrored current ISi. In this case, the predetermined current threshold Si for each current mirror 48 is determined by the resistance of the threshold adjustment resistor based on the following relationship:

$$Si = VQibe/RRS$$

where i=5, 7, 10, 12, 14, 16 and VQibe is the voltage between the base and emitter terminals of the transistor Qi and RRS is the resistance of the threshold adjustment resistor (R44, R12, R16, R20, R24, R31).

According to a variant not shown, the number of LEDs and/or LED electrical characteristics in the different lighting branches can be different from each other. In this case, the lighting branches may comprise passive devices, such as resistors, and/or semiconductor devices or the like having a resistance/impedance such that the total electrical load present in each branch is substantially equal to that present in other branches so as to ensure the proper functioning of the lighting device in the pre-lighting state.

The above described light has the following advantages.

First, the circuit architecture of the electronic control circuit in addition to being extremely simple and inexpensive to produce, since it does not require the presence of any microprocessors, it allows the lighting device to automatically transit in the pre-lighting state, i.e. in the safety condition in which the primary supplying current is minimal, at the occurrence of a failure of the LEDs associated both with a sharp increase in impedance of the LED corresponding for example to an open circuit, and a sharp drop in impedance of the same, e.g. corresponding to a short circuit.

In addition, the circuit architecture of the electronic control circuit allows, also thanks to the presence of the current limiting device, to greatly reduce the secondary current flowing through the LEDs in the pre-lighting step, thereby eliminating the generation of light pulses in the initial step.

Moreover, in case of failure, the current limiting device constantly maintains the nominal supply current below the predetermined minimum value, thereby creating an imperceptible state of luminosity of the LEDs completely similar to a single-source traditional light.

Finally, the strong current limitation attainable with the current limiting device allows the connecting of the lighting device to fault diagnosis electronic units adapted for determining the fault of the LEDs based on low intensity currents.

Finally, it appears clear that to the above described light, modifications and changes may be made without going beyond the scope of the present invention defined by the appended claims.

The invention claimed is:

1. A light (30) for motor vehicles and similar provided with a lighting device (31) comprising:
   two power supply lines (42,43) in which a primary supplying current (I1) flows;
   at least two lighting branches (34), which are connected in parallel to one another and to said power supply lines (42,43), each comprising one or more light sources (37) in which a secondary supplying current (I2*i*) flows; and
   electronic control means (33), which are configured to make said light sources (37) simultaneously transit from a pre-lighting state, in which a predetermined minimum secondary current (I2Mi) flows in the light sources (37) of each lighting branch (34), to a complete lighting state, in which a nominal secondary current (I2Ni) higher than said predetermined minimum secondary current (I2Mi) flows in the light sources (37) of each said lighting branch (34);
   said light (30) being characterized in that said electronic control means (33) are further configured to:
   determine the secondary current (I2*i*) flowing in each said lighting branch (34);
   limit said primary supplying current (I1) to a predetermined minimum value (I1M), when the secondary current (I2*i*) flowing in at least one of said lighting branches (34) is lower than a predetermined current threshold (Si);
   controlling control the simultaneous transition of said light sources (37) from said pre-lighting state to said complete lighting state, when each of the secondary currents (I2*i*) flowing in said lighting branches (34) is either higher than or equal to said predetermined current threshold (Si);
   wherein said two lighting branches (34) are connected to said lighting lines (42,43) by means of first (35) and second (36) common nodes placed at first (VA) and second (VR) predetermined voltages;
   said electronic control means (33) comprising:
   main switch means (44) connected between either said first (35) or second (36) common node and one of said power supply lines (42,43);
   current limiting means (45), which are connected in parallel to said first switch means (44) and are able to limit the primary supplying current (I1) to said predetermined minimum value (I1M); and
   electronic driving means (40), which are configured to open said main switch means (44) when the secondary current (I2*i*) flowing in at least one of said lighting branches (34) is lower than said predetermined current threshold (Si) or, vice versa, to close said main switch means (44) to make said light sources (34) simultaneously transit from said pre-lighting state to said lighting state when each of the secondary currents (I2*i*) flowing in said lighting branches (34) is higher than or equal to said predetermined current threshold (Si).

2. A light according to claim 1, wherein said main switch means (44) are configured to open or close based on a control current (ICOM);
   and wherein said electronic driving means (40) comprise:
   two or more secondary switch means (50), which are each associated with a respective lighting branch (34) and are configured to jointly generate said control current (ICOM); and
   means for determining the secondary current (48) flowing in each said lighting branch (34), which are configured to control the opening/closing of each said secondary switch (50) according to said secondary current (I2*i*) flowing in the corresponding lighting branch (34).

3. A light according to claim 2, wherein said means for determining the secondary current (48) comprise current mirroring means (48), which are arranged in each lighting branch (34) and are configured to output a mirroring current (ISi) of said secondary current (I2*i*) flowing in said lighting branch (34); and wherein each secondary switch means (50) is configured to close when the mirroring current (ISi) of the secondary current (I2*i*) flowing in a corresponding lighting branch (34) is either higher than or equal to said predetermined current threshold (Si) or, vice versa, to open when said mirroring current (ISi) is lower than said predetermined current threshold (Si).

4. A light according to claim 3, wherein said secondary switch means (50) are arranged in series to one another and are configured to control the closing of said main switch means (44), by means of said control signal (COM), when they are all in the closing state, or vice versa, to control the opening of said main switch means (44), by means of said control current (ICOM), when at least one secondary switch means (50) is open.

5. A light according to claim 4, wherein each of said current mirror means (48) comprises a pair of BJT transistors having emitter terminals connected to one another and to a common node by means of a resistor (R44); the resistance variation of said resistor (R44) determining the variation of said predetermined current threshold (Si).

6. A method of operating a lighting device (31) of a light (30) for motor vehicles or similar, wherein the lighting device (31) comprises:
two power supply lines (42,43) in which a primary supplying current (I1) flows;
at least two lighting branches (34), which are connected in parallel to one another and to said power supply lines (42,43) and each comprising one or more light sources (37) in which a secondary supplying current (I2i) flows;
said method comprising the step of making said light sources (37) simultaneously transit from a pre-lighting state, in which a second predetermined minimum secondary current (I2Mi) flows in the light sources (37) of each lighting branch (34), to a complete lighting state, in which a nominal secondary current (I2Ni) higher than said predetermined minimum secondary current (I2Mi) flows in the light sources (37) of each said lighting branch (34);
said method being characterized in that it comprises the steps of:
determining the secondary current (I2i) circulating in each said lighting branch (34);
limiting said primary supplying current (I1) to a predetermined minimum value (I1M) when the secondary current (I2i) flowing in at least one of said lighting branches (34) is lower than a predetermined current threshold (Si);
controlling the simultaneous transition of said light emitting sources (37) from said pre-lighting state to said lighting state, when each of the secondary currents (I2i) flowing in said lighting branches (34) is either higher than or equal to said predetermined current threshold (Si);
wherein said at least two lighting branches (34) are connected to the power supply lines (42,43) by means of first (35) and second (36) common nodes set to first (VA) and second (VR) predetermined voltages; and wherein said lighting device (31) comprises electronic control means (33) provided with:
main switch means (44) connected between one of said first (35) or second (36) common node and one of said power supply lines (42);
current limiting means (45), which are connected in parallel to said first switch means (44) and are configured to limit the primary supplying current (I1) to said predetermined minimum value (I1M);
said method further comprising the steps of:
controlling the opening of said main switch means (44) when the secondary current (I2i) flowing in at least one of said lighting branches (34) is lower than said predetermined current threshold (Si);
controlling the closing of said main switches (44) so as to make said light sources (37) simultaneously transit from said pre-lighting state to said lighting state, when each of the secondary currents (I2i) flowing in said lighting branches (34) is either higher than or equal to said predetermined current threshold (Si).

7. A method according to claim 6, wherein said main switch means (44) are configured to open or close according to a control current (ICOM); and wherein said lighting device comprises two or more secondary switch means (50), which are each associated with a respective lighting branch (34) and are configured to jointly generate said control current (ICOM);
said method comprising the steps of:
determining said secondary current (48) by means of current mirror means (48), which are arranged in each lighting branch (34) and are configured to output a mirroring current (ISi) of said secondary current (I2i) flowing in said lighting branch (34); and
controlling the closing of each secondary switch means (50) when the mirroring current (ISi) of the secondary current (I2i) flowing in a corresponding lighting branch (34) is either higher than or equal to said predetermined current threshold (Si);
controlling the closing of each secondary switch means (50) when said mirroring current (ISi) is lower than said predetermined current threshold (Si).

8. A lighting device (31) for lights (30) of motor vehicles and similar comprising:
two power supply lines (42,43) in which a primary supplying current (I1) flows;
at least two lighting branches (34), which are connected in parallel to one another and to said power supply lines (42,43) and each comprises one or more light sources (37) in which a secondary supplying current (I2i) flows; and
electronic control means (33), which are configured to make said light sources (37) simultaneously transit from a pre-lighting state, in which a predetermined minimum secondary current (I2Mi) flows in the light sources (37) of each lighting branch (34), to a complete lighting state, in which a nominal secondary current (I2Ni) higher than said predetermined minimum secondary current (I2Mi) flows in the light sources (37) of each said lighting branch (34);
said lighting device (31) being characterized in that said electronic control means (33) are further configured to:
determine the secondary current (I2i) circulating in each said lighting branch (34);
limiting said primary supplying current (I1) to a predetermined minimum value (I1M) when the secondary current (I21) flowing in at least one of said lighting branches (34) is lower than a predetermined current threshold (Si);
controlling the simultaneous transition of said light sources (37) from said pre-lighting state to said lighting state, when each of the secondary currents (I2i) flowing in said lighting branches (34) is either higher than or equal to said predetermined current threshold (Si);
wherein said at least two lighting branches (34) are connected to said power supply lines (42, 43) by means of first (35) and second (36) common nodes set to first (VA) and second (VR) predetermined voltages;
said electronic control means (33) comprising:
main switch means (44) connected between one of either said first (35) or second (36) common node and one of said power supply lines (42);
current limiting means (45), which are connected in parallel to said first switch means (44) and are configured to limit the primary supplying current (I1) to said predetermined minimum value (I1M); and
electronic driving means (40), which are configured so as to control the opening of said main switch means (44)

when the secondary current (I2i) flowing in at least one of said lighting branches (34) is lower than said predetermined current threshold (Si) or, vice versa, to control the closing of said main switch means (44) to make said light sources (34) simultaneously transit from said pre-lighting state to said lighting state when each of the secondary currents (I2i) flowing in said lighting branches (34) is higher than or equal to said predetermined current threshold (Si).

9. A lighting device (31) according to claim 8, wherein said main switch means (44) are configured to open or close according to a control current (ICOM); and wherein
said electronic driving means (40) comprise:
two or more secondary switch means (50), which are each associated with a respective lighting branch (34) and are configured to jointly generate said control current (ICOM); and
means for determining the secondary current (48) flowing in each said lighting branch (34), which are configured so as to control the opening/closing of each said secondary switch means (50) according to said secondary current (I2i) flowing in the corresponding lighting branch (34).

10. A lighting device (31) according to claim 9, wherein said means for determining the secondary current (48) comprise current mirroring means (48), which are arranged in each lighting branch (34) and are configured to output a mirroring current (ISi) of said secondary current (I2i) flowing in said lighting branch (34); and wherein each said secondary switch means (50) is configured to close when the mirroring current (ISi) of the secondary current (I2i) flowing in a corresponding lighting branch (34) is either higher than or equal to said predetermined current threshold (Si) and, vice versa, are configured to open when said mirroring current (ISi) is lower than said predetermined current threshold (Si).

11. A lighting device (31) according to claim 10, wherein said secondary switch means (50) are arranged in series to one another and are configured to control the closing of said main switch means (44), by means of said control signal (COM), when they are all closed, or vice versa, to control the opening of said main switch means (44), by means of said control current (ICOM), when at least one secondary switch means (50) is open.

12. A lighting device (31) according to claim 11, wherein each of said current mirror means (48) comprises a pair of BJT transistors having emitter terminals connected to one another and to a common node (35) by means of a resistor (R44); the resistance variation of said resistor (R44) determining the variation of said predetermined current threshold (Si).

* * * * *